(12) United States Patent
Sato

(10) Patent No.: US 11,756,754 B2
(45) Date of Patent: Sep. 12, 2023

(54) SWITCH DEVICE

(71) Applicant: DENSO CORPORATION, Kariya (JP)

(72) Inventor: Katsuya Sato, Kariya (JP)

(73) Assignee: DENSO CORPORATION, Kariya (JP)

( * ) Notice: Subject to any disclaimer, the term of this patent is extended or adjusted under 35 U.S.C. 154(b) by 140 days.

(21) Appl. No.: 17/324,853

(22) Filed: May 19, 2021

(65) Prior Publication Data

US 2021/0272762 A1 Sep. 2, 2021

Related U.S. Application Data

(63) Continuation of application No. PCT/JP2019/042572, filed on Oct. 30, 2019.

(30) Foreign Application Priority Data

Nov. 29, 2018 (JP) ................................. 2018-223561

(51) Int. Cl.
| | | |
|---|---|---|
| *H01H 19/14* | (2006.01) | |
| *H01H 25/06* | (2006.01) | |
| *B60R 16/02* | (2006.01) | |
| *G05G 1/10* | (2006.01) | |
| *H01H 13/20* | (2006.01) | |

(52) U.S. Cl.
CPC ............ *H01H 25/06* (2013.01); *B60R 16/02* (2013.01); *G05G 1/10* (2013.01); *H01H 13/20* (2013.01); *H01H 19/14* (2013.01)

(58) Field of Classification Search
CPC ...... H01H 19/14; H01H 19/11; H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01

See application file for complete search history.

(56) References Cited

U.S. PATENT DOCUMENTS

| | | | |
|---|---|---|---|
| 6,080,942 | A | 6/2000 | Sasaki |
| 2012/0160647 | A1 | 6/2012 | Yashima |
| 2017/0052617 | A1 | 2/2017 | Okuzumi et al. |
| 2017/0117106 | A1 | 4/2017 | Shitanaka et al. |
| 2018/0373351 | A1 | 12/2018 | Sawada et al. |
| 2019/0250740 | A1 | 8/2019 | Okuzumi et al. |

FOREIGN PATENT DOCUMENTS

| | | |
|---|---|---|
| JP | H10228843 A | 8/1998 |
| JP | 2007299037 A | 11/2007 |
| JP | 2012134026 A | 7/2012 |
| JP | 2015037582 A | 2/2015 |
| JP | 2018004493 A | 1/2018 |
| WO | WO-2015159494 A1 | 10/2015 |
| WO | WO-2015174092 A1 | 11/2015 |
| WO | WO-2017094234 A1 | 6/2017 |

*Primary Examiner* — Ahmed M Saeed

(74) *Attorney, Agent, or Firm* — Harness, Dickey & Pierce, P.L.C.

(57) ABSTRACT

A switch device includes: an adhesive base adhered to a surface of a surface member; and an operation assembly connected to the adhesive base. The operation assembly includes: an operation base connected to the adhesive base; and an operation knob that is rotatable with respect to the operation base. The operation knob is connected to the adhesive base and is removable from the adhesive base in an axial direction of the operation knob.

10 Claims, 9 Drawing Sheets

SWITCH DEVICE

CROSS REFERENCE TO RELATED APPLICATION

The present application is a continuation application of International Patent Application No. PCT/JP2019/042572 filed on Oct. 30, 2019, which designated the U.S. and claims the benefit of priority from Japanese Patent Application No. 2018-223561 filed on Nov. 29, 2018. The entire disclosures of all of the above applications are incorporated herein by reference.

TECHNICAL FIELD

The present disclosure relates to a switch device.

BACKGROUND

In recent years, there has been an increasing need for a product with a switch device to intuitively operate at a position close to a display.

SUMMARY

According to an aspect of the present disclosure, a switch device includes: an adhesive base adhered to a surface of a surface member; and an operation assembly connected to the adhesive base. The operation assembly includes: an operation base connected to the adhesive base; and an operation knob that is rotatable with respect to the operation base. The operation knob is connected to the adhesive base and is removable from the adhesive base in an axial direction of the operation knob.

BRIEF DESCRIPTION OF THE DRAWINGS

The above features and advantages of the present disclosure will become more apparent from the following detailed description made with reference to the accompanying drawings. In the drawings.

DESCRIPTION OF EMBODIMENT

Figure 1:
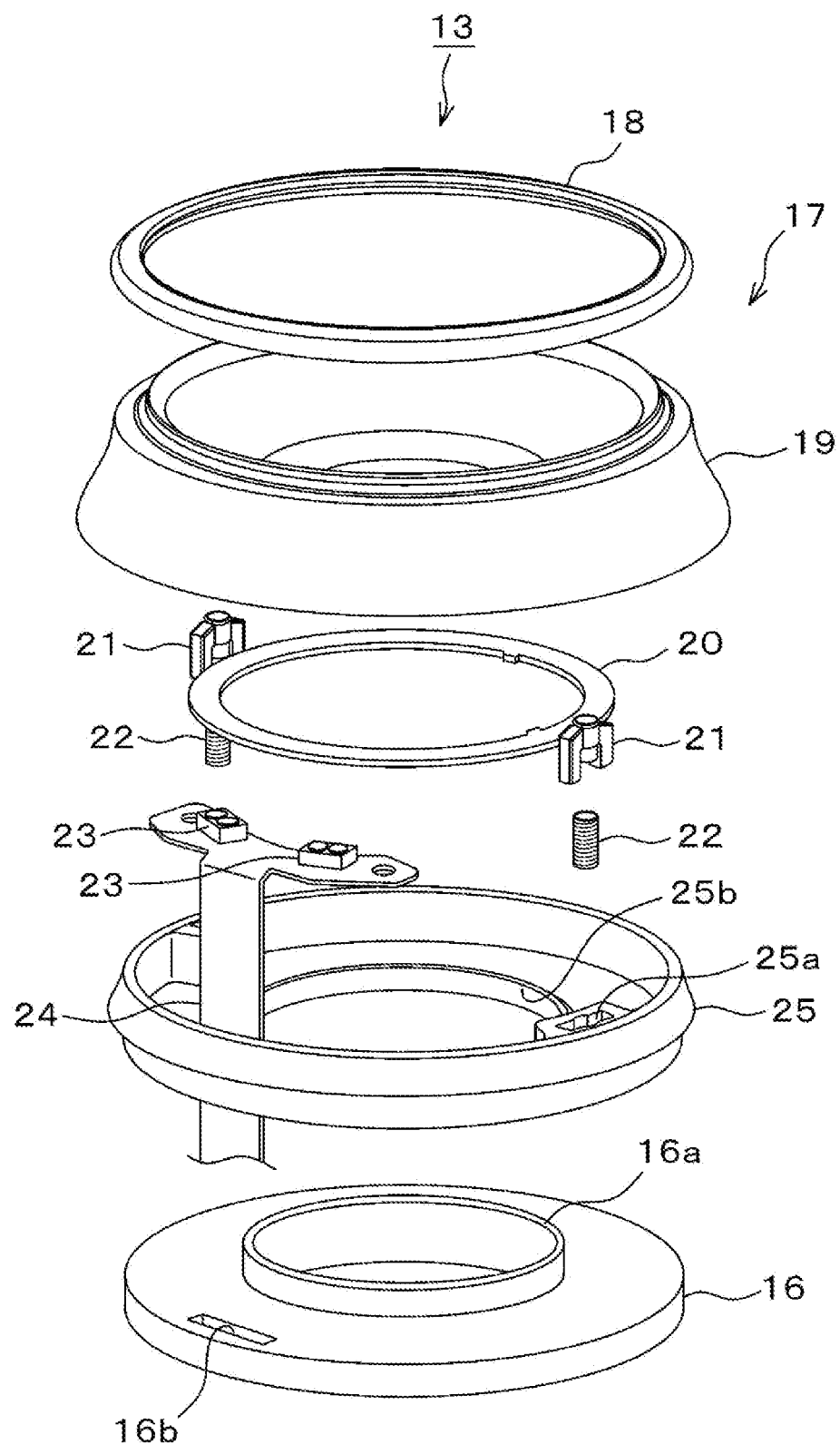
FIG. 1 is an exploded perspective view illustrating a switch device according to a first embodiment.

To begin with, examples of relevant techniques will be described.

In recent years, there has been an increasing need for a product having a switch device to intuitively operate at a position close to a display. The switch device has an operation knob mounted on a screen display unit of a center information display (CID) or other panel products for a vehicle.

The switch device may be fixed on a panel by fitting or adhesive. However, when the switch device is bonded onto the panel, it is difficult to position the switch device and to adjust the load, depending on the shape of the operation knob, at the time of bonding. In addition, it is difficult to rework the adhesive because the adhesive substance remains on the surface and cannot be removed. If the worker fails in the reworking, it may be necessary to discard the switch device. In this case, the cost of defective work becomes large.

The present disclosure provides a switch device which can be easily bonded to a surface member in an alignment and an adjustment of a load, regardless of the shape of the operation knob, and to minimize the cost of defective work.

In the first aspect of the present disclosure, the adhesive base is adhered to the surface of the surface member, and then an operation assembly is connected to the adhesive base. This facilitates alignment and adjustment of the load regardless of the shape of the operation knob when bonding the adhesive base. Further, if the bonding fails, only the adhesive base needs to be discarded, so that the cost of defective work can be minimized.

Hereinafter, multiple embodiments will be described with reference to the drawings. In the embodiments, functionally and/or structurally corresponding parts are denoted by the same reference numerals.

First Embodiment

A first embodiment will be described with reference to FIG. 1 to FIG. 5. As shown in FIG. 2, an instrument panel 3 is provided at a front portion of a cabin in front of a driver seat 1 and a passenger seat 2. A center information display (CID) 4 is provided at the center of the instrument panel 3. The CID 4 is an information display device having functions such as air conditioning, navigation, audio, and telephone.

Figure 3:
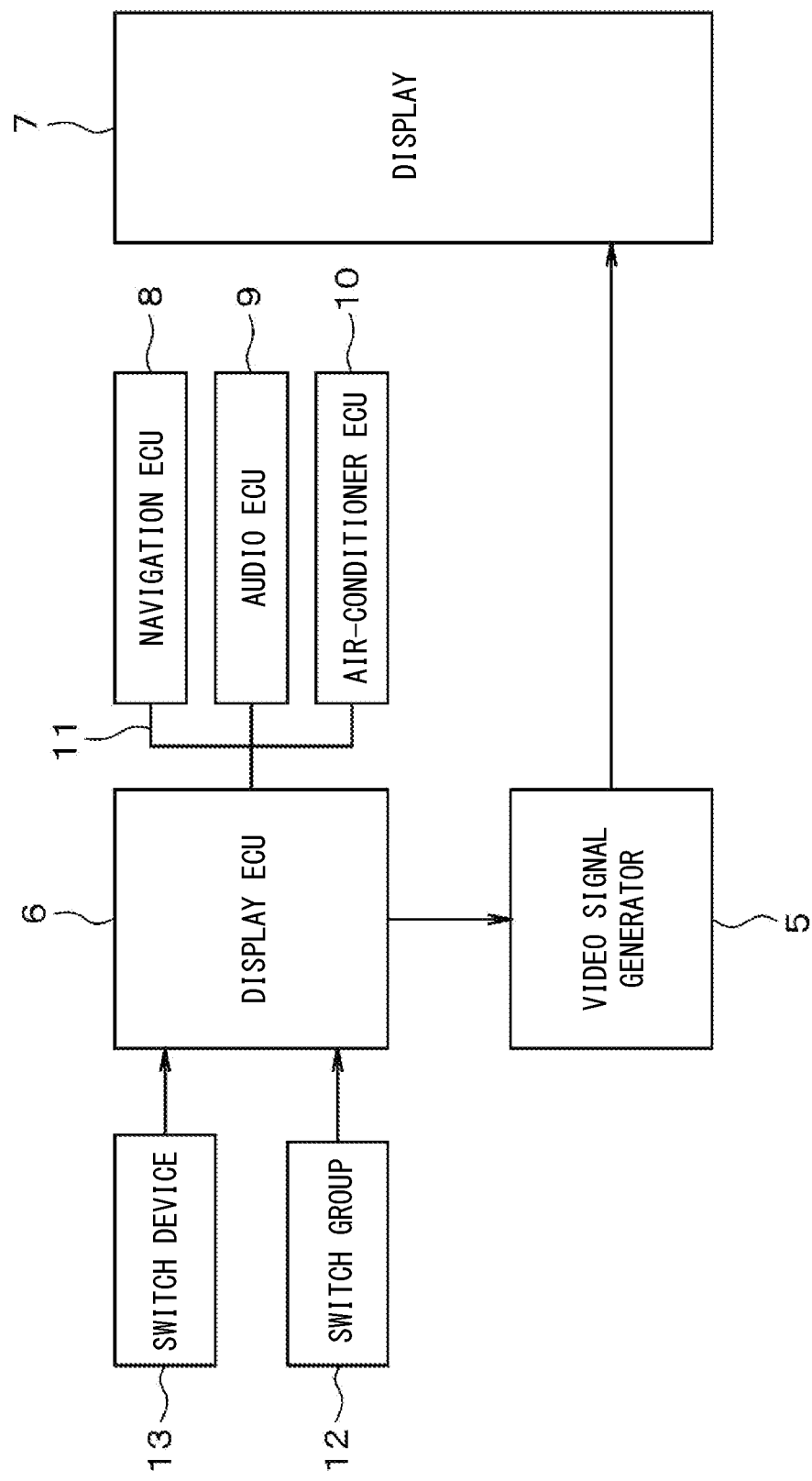
FIG. 3 is a block diagram illustrating an electrical configuration of the switch device.

As shown in FIG. 3, a video signal generator 5 outputs a predetermined video signal to a display 7 of the CID 4 in response to a command from a display ECU 6. The display 7 includes, for example, a full-color liquid crystal and a backlight, and displays a predetermined image by receiving a video signal from the video signal generator 5. Specifically, the display 7 displays a navigation image that superimposes the current location and traveling direction of the vehicle on the surrounding road map. The display 7 displays an audio operation image, a menu selection image that allows the user to input and set various instructions, and various messages. The user is a concept that includes not only the driver but also passengers on the passenger seat and the rear seat.

The display ECU 6 is connected to various ECUs such as navigation ECU 8, audio ECU 9, and air conditioner ECU 10 via an on-vehicle network 11 to transmit information.

As shown in FIG. 2, switches are arranged around the CID 4 as a switch group 12. The display ECU 6 identifies a process requested by the user based on the position information from the switch group 12 and a touch sensor (not shown), and instructs the ECUs 8 to 10. The ECU 8 to 10 respectively execute navigation processing, audio processing, and air conditioning processing in response to a command from the display ECU 6.

As shown in FIG. 2, a switch device 13 is mounted on the surface of the CID 4. The display ECU 6 selects or determines a control target based on a detection signal from the switch device 13.

Figure 4:
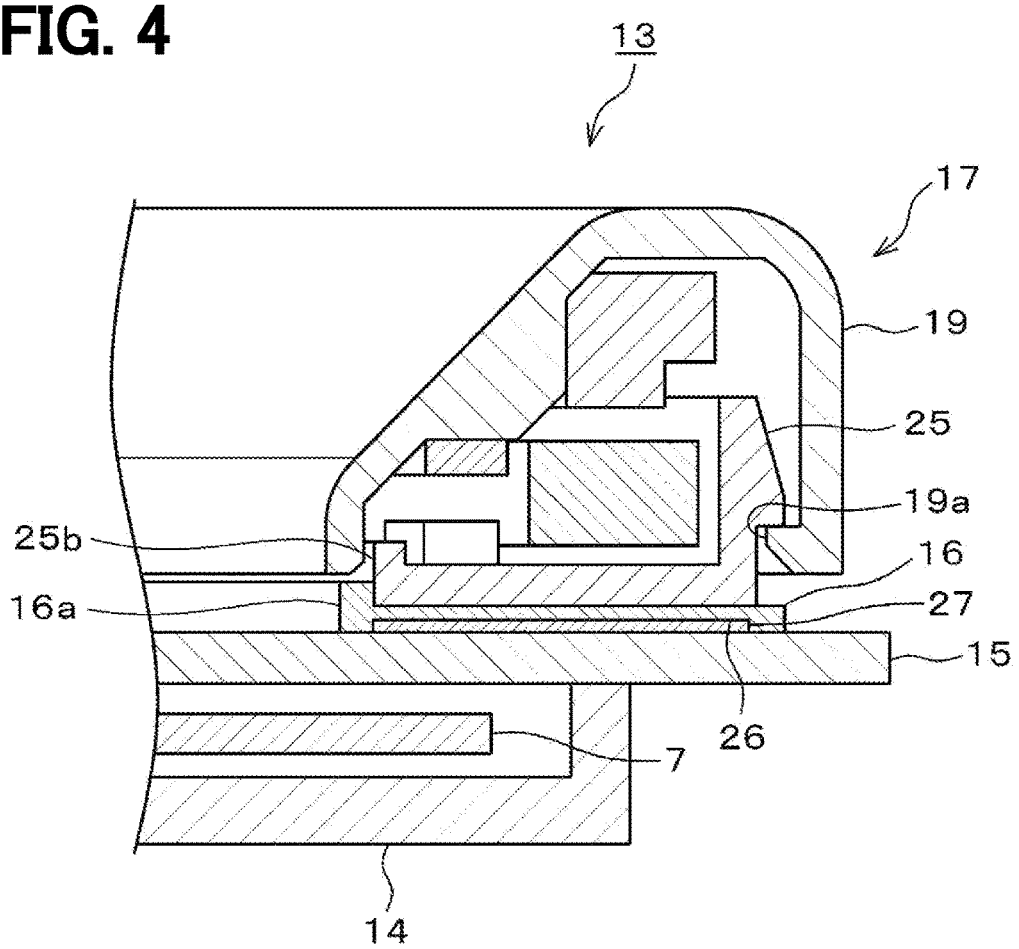
FIG. 4 is a cross-sectional view schematically illustrating the switch device.

A structure for mounting the switch device 13 on the CID 4 will be described. As shown in FIG. 4, a case 14 holds a panel 15 (corresponding to a surface member) that functions as an overlay, and functions as a reinforcing member for fixing the panel 15. The display 7 is arranged inside the case 14.

Figure 5:
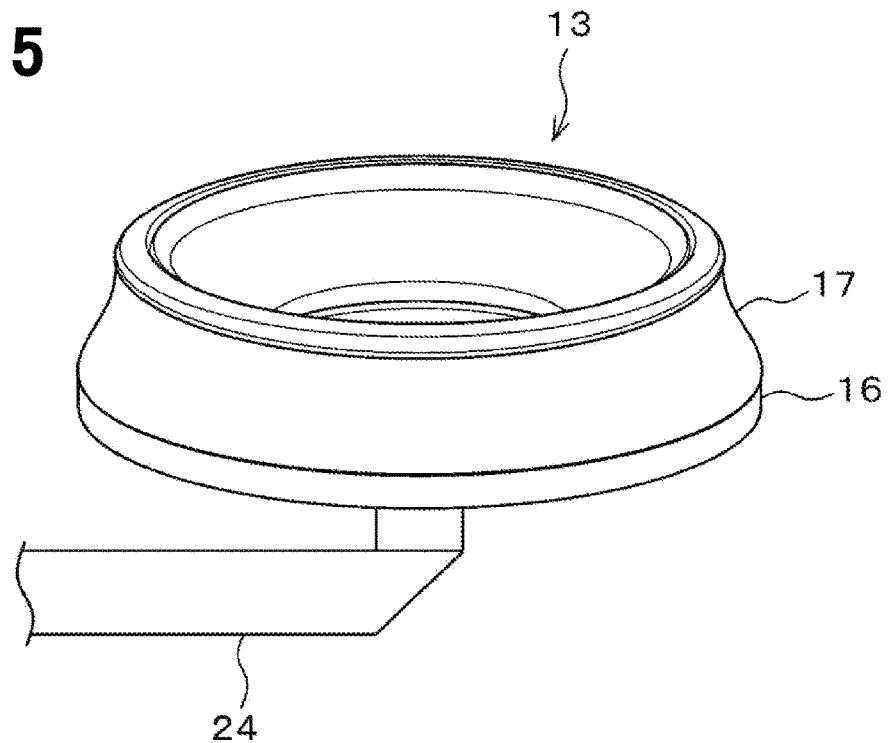
FIG. 5 is a perspective view of the switch device.

As shown in FIG. 5, the switch device 13 includes an adhesive base 16 and a knob assembly 17 (corresponding to an operation assembly). The adhesive base 16 is adhered to the surface of the panel 15 with an adhesive, and the knob assembly 17 is connected to the adhesive base 16.

Figure 2:
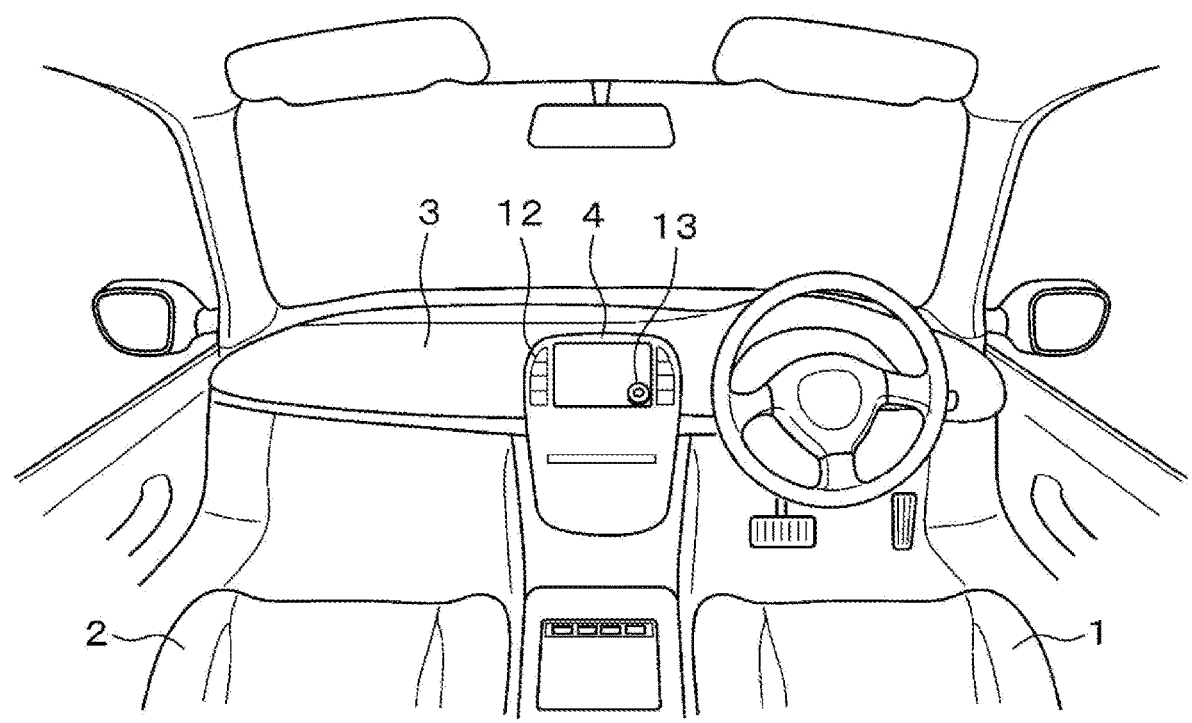
FIG. 2 is a perspective view illustrating a front portion of a cabin.

As shown in FIG. 1, the knob assembly 17 includes an aluminum ring 18, a dial knob 19 (corresponding to an operation knob), a reflector 20, a plunger 21, a spring 22, an optical sensor 23 (corresponding to a detector), a flexible printed circuit (FPC) 24 (corresponding to an output unit), and a knob base 25 (corresponding to an operation base).

As shown in FIG. 4, the dial knob 19 is mounted on the knob base 25, and electrical components of the switch device are mounted in a space surrounded by the dial knob 19 and the knob base 25. FIG. 4 schematically shows the electrical components.

The adhesive base 16 is a disk-shaped resin molded product. As shown in FIG. 4, an annular groove portion 26 is formed on the back side of the adhesive base 16. The adhesive base 16 is adhered to the surface of the panel 15 by the adhesive material 27 applied to the annular groove portion 26. A double-sided tape having a strong adhesive force may be used instead of the adhesive. The panel 15 is formed of flat glass or transparent resin, but the surface shape may be either flat or curved.

The aluminum ring 18 shown in FIG. 1 functions as a design member mounted on the surface of the dial knob 19. The dial knob 19 is a resin molded product made of a relatively flexible resin (ABS or elastomer). Plural claws 19a (see FIG. 4) are formed at the lower end of the outer peripheral surface of the dial knob 19. The dial knob 19 is attached to the knob base 25 by engagement between the claws 19a and the lower end of the outer peripheral surface of the knob base 25. The dial knob 19 may be made of metal while the dial knob 19 can be engaged with the knob base 25.

Two optical sensors 23 are mounted on the FPC 24. An increment type rotary encoder is configured by the optical sensors 23 and the reflector 20. The reflector 20 is fixed to the back surface of the dial knob 19, and is positioned such that the optical sensor 23 projects light on the rotation truck of the reflector 20.

Reflecting portions and non-reflective portions are alternately formed on the reflector 20. When the reflecting portion is located in a light projecting region from the optical sensor 23, the optical sensor 23 receives the light reflected by the reflecting portion. As a result, the amount of rotation of the reflector 20 can be detected based on the number of ON/OFF times of the light receiving signal.

Since the two optical sensors 23 are positioned so that the phase of the ON level of the light receiving signal is shifted by 90 degrees, the rotation direction of the reflector 20 can be detected based on the ON/OFF timing of the two light receiving signals. The rotation detection is not limited to be performed by the optical sensor. A magnetic sensor, an electrostatic sensor, a two-way sensor, or an encoder may be used for the rotation detection.

The FPC 24 is fixed to a boss (not shown) formed on the bottom surface of the knob base 25. The FPC 24 passes through a hole 16b formed in the adhesive base 16, as shown in FIG. 1, and then, the FPC 24 is led out from the switch device 13 and connected to the display ECU 6.

A back surface of the dial knob 19 facing the knob base 25 has peaks and valleys (not shown) alternately formed concentrically. The plunger 21 and the spring 22 are housed in a storage portion 25a formed in the knob base 25. The plunger 21 functions as an adjustment mechanism by being urged on the rotation track of the peaks and valleys formed on the dial knob 19 by the spring 22. A leaf spring may be adopted instead of the plunger as the adjustment mechanism.

A cylindrical portion 16a (corresponding to a connector) is formed to protrude from the adhesive base 16. The cylindrical portion 16a is fitted into a hole 25b (corresponding to a connector) formed in the knob base 25 in a press-fitted state, such that the adhesive base 16 is connected to the knob base 25. A connecting structure other than press-fitting can be adopted to connect the adhesive base 16 to the knob base 25. However, it is desirable to adopt a connecting structure that can easily connect the adhesive base 16 to the knob base 25 without using an adhesive member such as an adhesive or double-sided tape.

A procedure for mounting the switch device 13 on the surface of the panel 15 will be described. The adhesive base 16 is gripped by an automatic machine (not shown), and a predetermined amount of adhesive is applied to the annular groove portion 26 from a dispenser in the state where the adhesive base 16 is turned upside down. Then, the adhesive base 16 is turned over again, and the adhesive base 16 is bonded to the surface of the panel 15. A camera or the like is used to align the adhesive base 16 with respect to the surface of the panel 15. When a worker attaches the adhesive base 16 to the surface of the panel 15, a jig for alignment is used.

Next, the FPC 24 is fixed to the adhesive base 16. If the output of a sensor detection result is not needed, this step can be omitted.

Next, components other than the adhesive base 16 are assembled in advance as a knob assembly 17 in a separate process, and the knob assembly 17 is connected to the adhesive base 16. The assembling process can be facilitated or automated by the separate process since the knob assembly 17 is composed of the small components. As described above, the switch device 13 can be mounted on the surface of the panel 15.

When the user rotates the dial knob 19, the dial knob 19 rotates with respect to the knob base 25. The optical sensor 23 detects the amount and direction of rotation of the dial knob 19, and the detection result is output to the display ECU 6 via the FPC 24. The display ECU 6 switches the menu displayed by the display 7 according to the detection result. The display ECU 6 switches buttons to be selected, and confirms the selection result. Specifically, the display ECU 6 selects the audio, the navigation, or the air conditioning according to the rotation operation. The display ECU 6 selects a sound source, sets a destination, and sets a target temperature according to the selected menu.

According to the present embodiment, the following effects can be achieved.

The switch device 13 includes the adhesive base 16 and the knob assembly 17. The adhesive base 16 is adhered to the surface of the panel 15 with an adhesive, and then the knob assembly 17 is connected to the adhesive base 16. Therefore, it is easier to align the adhesive base 16 and to adjust the load at the time of adhesion, compared with a configuration in which the assembled switch device is adhered to the surface of the panel 15 with an adhesive.

It difficult to rework with the adhesive since the adhesive remains on the surface and cannot be removed if the first work fails. It may be necessary to discard the adhered parts, but only the adhesive base 16 needs to be discarded. Therefore, the cost of defective work can be minimized.

Second Embodiment

A second embodiment will be described with reference to FIGS. 6 and 7. In the second embodiment, the dial knob 19 is configured to be press-operable.

Figure 6:
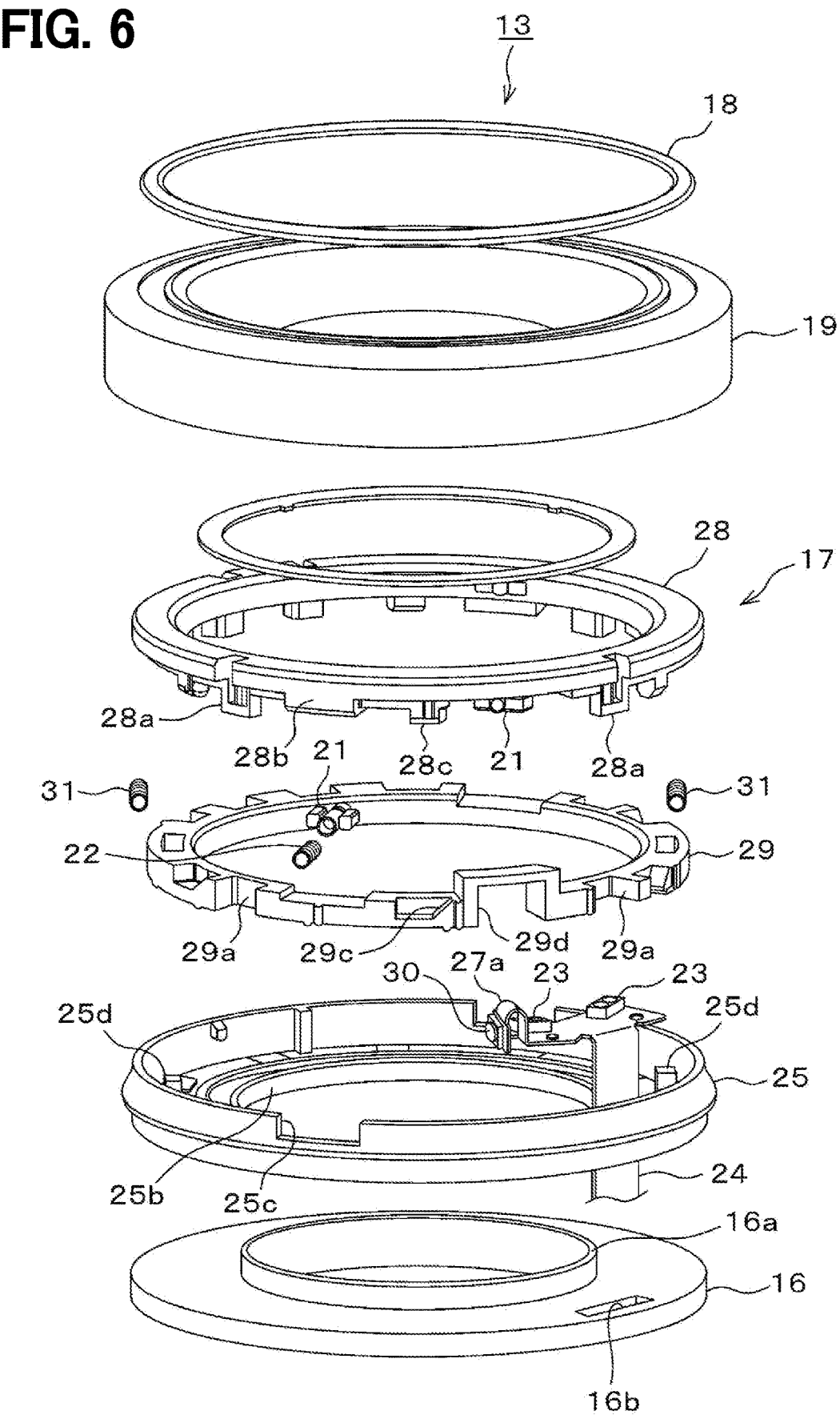
FIG. 6 is an exploded perspective view illustrating a switch device according to a second embodiment.

As shown in FIG. 6, the knob assembly 17 further includes a push ring 28, a rotation ring 29, a tact switch 30 (corresponding to a detector), and a spring 31 (corresponding to an urging portion), compared with the first embodiment. The push ring 28, the rotation ring 29, the tact switch 30, and the spring 31 are assembled as components of the knob assembly 17.

Plural tongue portions 28a are formed on the push ring 28. The tongue portions 28a are attached to the knob base 25 by entering plural groove portions 29a formed in the rotation ring 29 respectively. In this case, the width of the groove portion 29a is set larger than the width of the tongue portion 28a, such that the rotation ring 29 can rotate with respect to the push ring 28 by a play amount.

Figure 7:
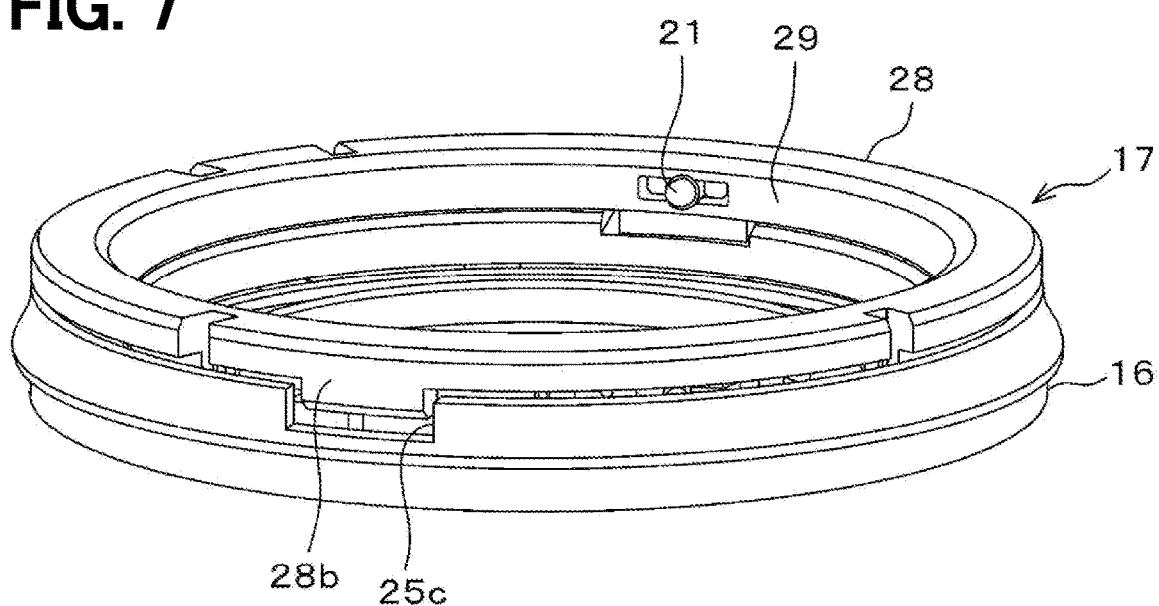
FIG. 7 is a perspective view illustrating a knob base combined with a push ring and a rotation ring.

The push ring 28 has a ridge portion 28b to be fitted with a notch 25c formed in the knob base 25, such that the push ring 28 is attached to the knob base 25 (as shown in FIG. 7). As a result, the push ring 28 is restricted from rotating with respect to the knob base 25.

A pressing portion 28c is formed on the push ring 28, and the pressing portion 28c comes into contact with an inclined portion 29c formed on the rotation ring 29. When the pressing portion 28c moves in the pressing direction (downward in FIG. 6), the inclined portion 29c is pressed by the pressing portion 28c such that the rotation ring 29 rotates with respect to the knob base 25.

A folded portion 27a is formed in the FPC 24, and the tact switch 30 is mounted on the folded portion 27a. A convex portion (not shown) formed on the knob base 25 enters the folded portion 27a. As a result, the tact switch 30 is positioned.

A vertical portion 29d is formed on the rotation ring 29, and faces the tact switch 30. The vertical portion 29d presses the tact switch 30 by rotating with the rotation of the rotation ring 29. The tact switch 30 is turned ON when being pressed, to give a sense of click for the user. With the above configuration, the tact switch 30 is turned on by the pressing operation on the dial knob 19, so that the pressing operation on the dial knob 19 can be detected.

For detecting the pressing operation on the dial knob 19, a magnetic sensor, an electrostatic sensor, an optical sensor, a pressure sensitive sensor, and a strain sensor may be adopted other than the tact switch.

The spring 31 is interposed between the rotation ring 29 and the vertical portion 25d formed on the knob base 25, and applies an urging force to the rotation ring 29 toward the initial position. The back surface of the dial knob 19 has peaks and valleys (not shown) alternately formed concentrically on the cylindrical outer surface with the central axis. The plunger 21 functions as an adjustment mechanism by being urged by the spring 31 to the rotation track of the peaks and valleys. A leaf spring may be adopted instead of the plunger as the adjustment mechanism.

When the user presses the dial knob 19, the rotation ring 29 rotates to press the tact switch 30. As a result, the tact switch 30 is turned on, so that the operation can be confirmed by pressing the dial knob 19.

According to the present embodiment, the switch device 13 is configured to enable a pressing operation in addition to a rotation operation. Thus, the present disclosure can be applied to many types of switch devices.

Third Embodiment

Figure 8:
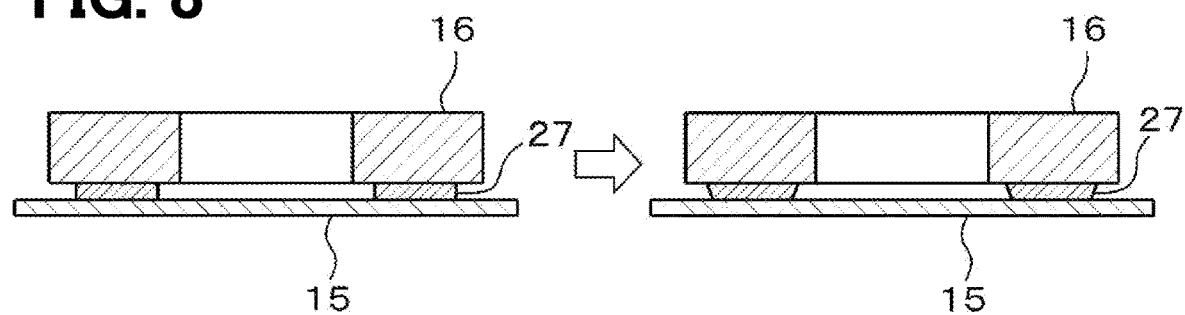
FIG. 8 is a cross-sectional view illustrating a strain state of a switch device according to a third embodiment.

A third embodiment will be described with reference to FIG. 8. The material of the adhesive base 16 is modified in the third embodiment.

In a comparison example, the surface material of the panel 15 is glass and the material of the adhesive base 16 is resin. A stress is applied to an adhesive surface of the adhesive material 27 when the temperature changes, due to a difference in linear expansion coefficient between the panel 15 and the adhesive base 16. For this reason, stress acts on the adhesive and the interface to cause distortion. In this comparison example, the adhesive force of the switch device 13 may be reduced relative to the surface of the panel 15. In this case, the switch device 13 may fall off.

Under these circumstances, the adhesive base 16 is made of, for example, a sheet metal such as SECC or SUS, or a molded product produced by using a die. Alternatively, the adhesive base 16 is a metal-insert molded product. The coefficient of linear expansion of metal (for example, 10 to $20 \times 10^{-6}$/° C.) is close to the coefficient of linear expansion of glass (for example, $9 \times 10^{-6}$/° C.), compared with that of resin (for example, 50 to $100 \times 10^{-6}$/° C.). Therefore, the difference in linear expansion coefficient between the surface of the panel 15 and the adhesive base 16 can be suppressed. When the adhesive base 16 is made of the same member as the panel 15, the linear expansion coefficients are the same, so that the influence caused by change in temperature does not occur at all. When the overlay to which the adhesive base 16 is adhered is made of resin, the adhesive base 16 is made of resin.

According to the present embodiment, the adhesive base 16 is formed of a material that is the same as or close to the coefficient of linear expansion of the surface of the panel 15. Therefore, distortion generated on the adhesive surface of the adhesive material 27 is suppressed. Thus, the reliability in adhesion can be improved.

Fourth Embodiment

The fourth embodiment will be described with reference to FIGS. 9 to 12. In the fourth embodiment, the adhesive base 16 and the knob base 25 can be connected with each other in a state where the positioning is completed.

When the knob assembly 17 is connected to the adhesive base 16, it is difficult to set the position and orientation, since the dial knob 19 often has a symmetrical structure in the vertical and horizontal directions. Further, it is difficult to fix with the jig due to the rotation function and the pressing function. Moreover, it is difficult to apply a load at the time of bonding.

Since the adhesive base 16 is not a design part, that is, basically invisible to the user, it is easy to form a notch or to process the surface for positioning, holding, and pressurizing. Therefore, the connection structure between the adhesive base 16 and the knob base 25 is devised. In case where the adhesive base 16 is formed of a transparent member such as glass and the back surface is printed or etched for positioning, the positioning can be visually achieved. In this case, it is possible to omit the notch or the surface for positioning, holding, and pressurizing.

Figure 9:
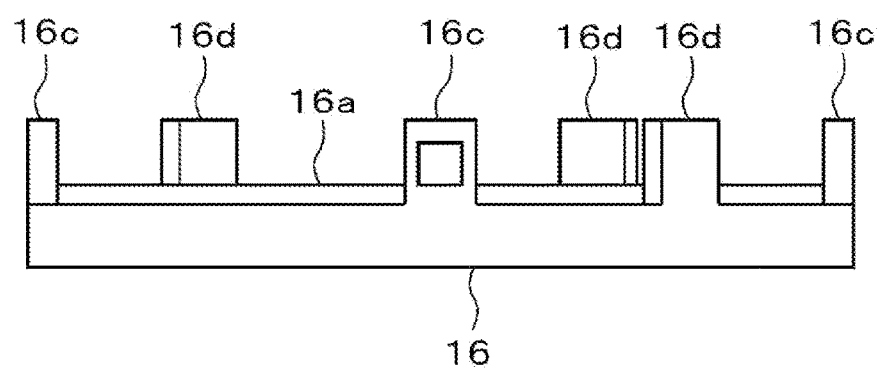
FIG. 9 is a side view illustrating an adhesive base of a switch device according to a fourth embodiment.
Figure 10:
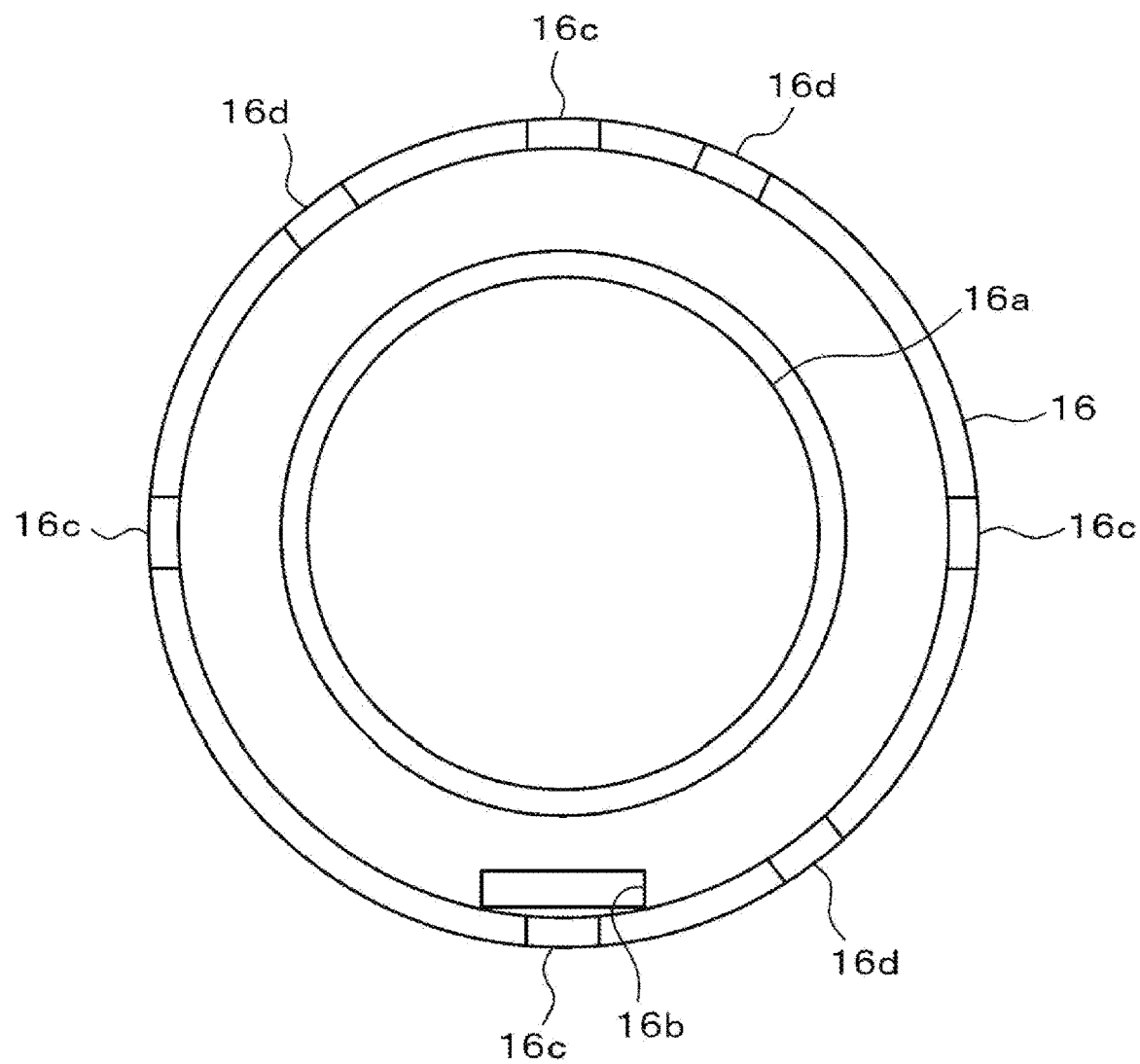
FIG. 10 is a plan view illustrating the adhesive base.

As shown in FIGS. 9 and 10, plural hook portions 16c (corresponding to a connector) and plural protrusions 16d are projected from the peripheral edge of the adhesive base 16. In this case, the hook portions 16c are formed at positions point-symmetrical with respect to the central axis, but the protrusions 16d are formed at asymmetrical positions. The connection position of the knob base 25 with respect to the adhesive base 16 cannot be fixed only with the hook portions 16c. Therefore, the connection position is regulated by the protrusions 16d. It is also possible to form the hook portions 16c at asymmetrical positions with respect to the central axis, but in that case, the connection between the adhesive base 16 and the knob base 25 becomes unstable at some positions.

Figure 11:
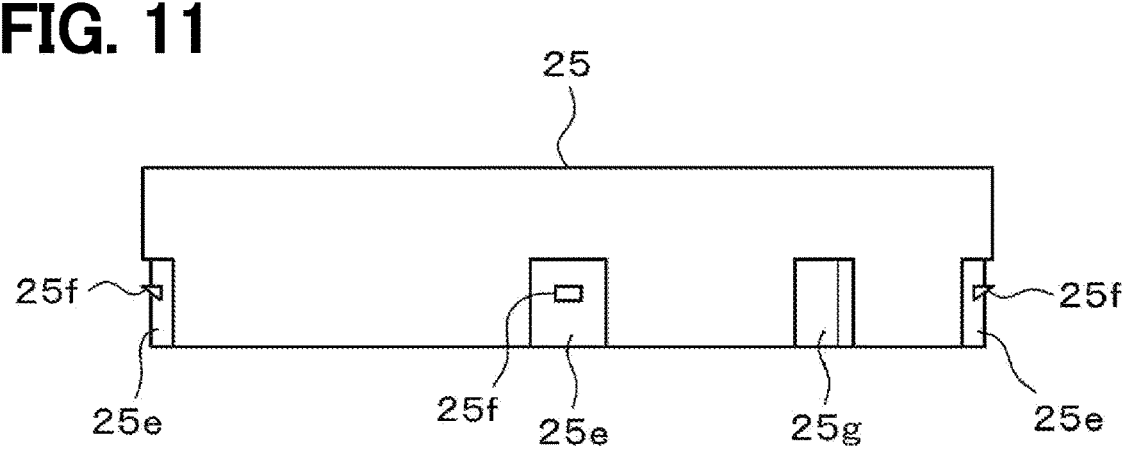
FIG. 11 is a side view illustrating a knob base.
Figure 12:
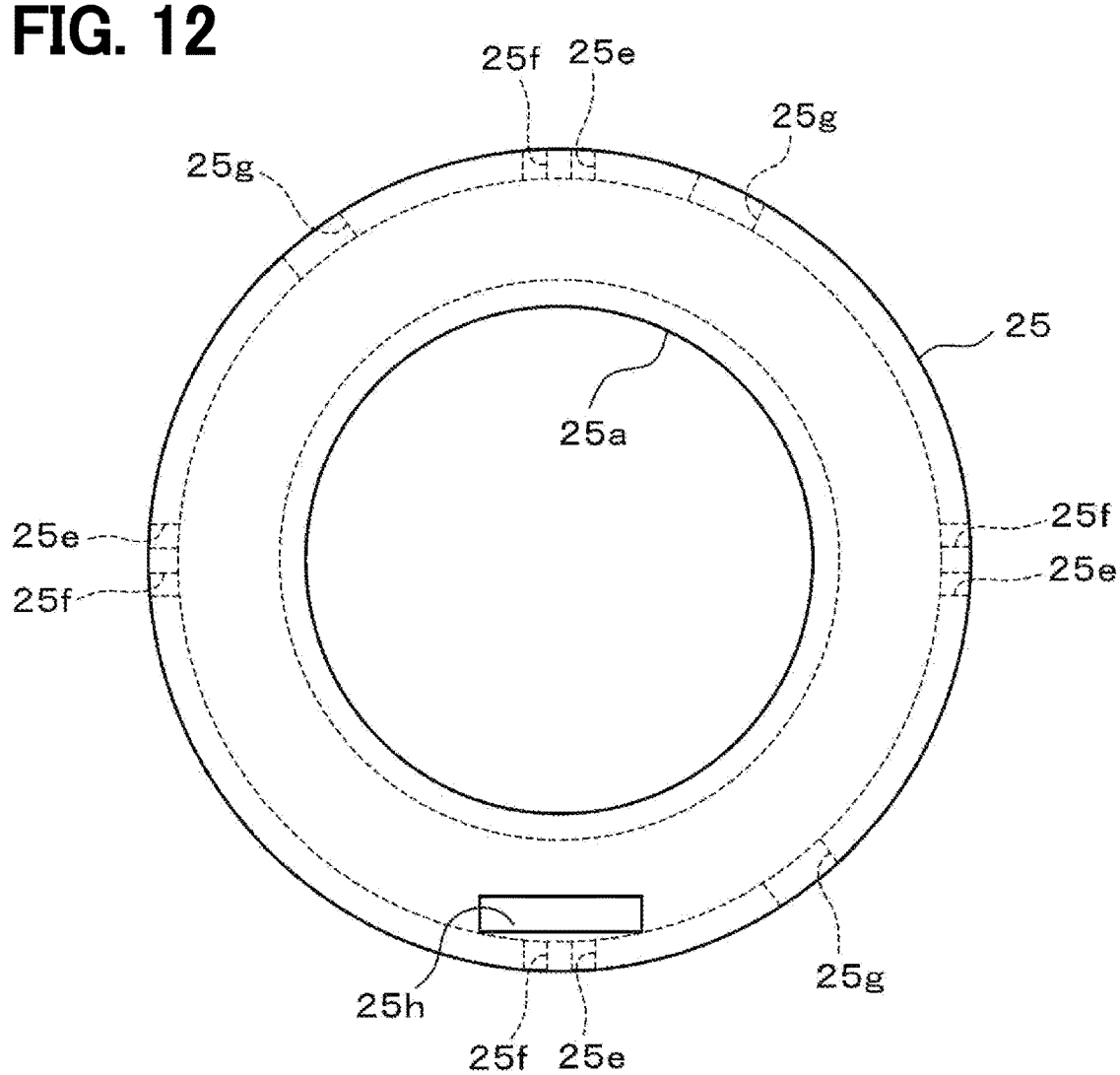
FIG. 12 is a plan view illustrating the knob base.

As shown in FIGS. 11 and 12, a groove portion 25e is formed on the outer peripheral surface of the knob base 25 at a position corresponding to the hook portion 16c of the adhesive base 16. A claw portion 25f (corresponding to a connector) is formed in the groove portion 25e. A groove portion 25g is formed at a position facing the protrusion 16d. A hole 25h is formed in the knob base 25, and the FPC 24 passes through the hole 25h.

When the knob assembly 17 is pushed into the adhesive base 16 in the aligned state, the hook portion 16c of the adhesive base 16 engages with the claw portion 25f of the knob base 25, and the protrusion 16d of the adhesive base 16 fits into the groove portion 25g of the knob base 25. In this case, the hook portion 16c of the adhesive base 16 engaged with the claw portion of the knob base 25 is flush with the outer peripheral surface of the knob base 25, but it may not have to be flush with each other.

According to the present embodiment, the adhesive base 16 and the knob base 25 can be connected with each other in the positioned state. Therefore, the knob assembly 17 can be easily connected to the adhesive base 16 in the aligned state. Since the adhesive base 16 and the knob base 25 are connected with each by the engagement, they can be mechanically and securely connected with each other.

Fifth Embodiment

The fifth embodiment will be described with reference to FIGS. 13 to 15. In the fifth embodiment, the connecting force of the knob assembly 17 connected to the adhesive base 16 is suppressed.

If the CID 4 has the configuration in which the switch device 13 is not mounted on the surface of the panel 15, the adhesive strength does not become an issue since a strong external force is not applied to the surface of the panel 15. However, when the switch device 13 is mounted on the surface of the panel 15 in the CID 4, it is required that the CID 4 does not break down when a force is applied by a dial operation by the user.

Figure 13:
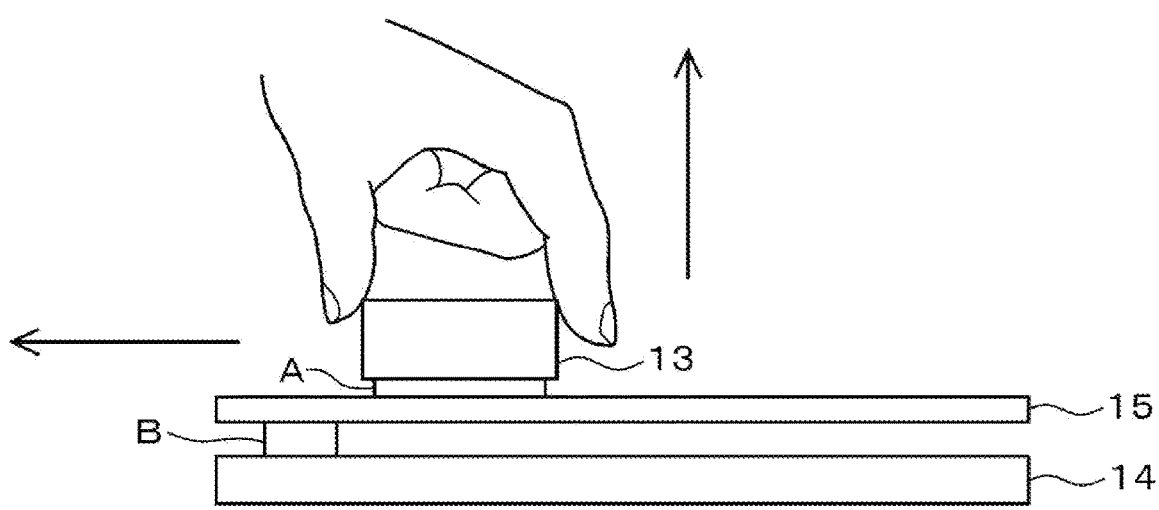
FIG. 13 is a diagram illustrating a direction in which an operating force acts on a switch device according to a fifth embodiment.

Under these circumstances, as schematically shown in FIG. 13, an adhesion A is defined between the switch device 13 and the surface of the panel 15, and an adhesion B is defined between the surface of the panel 15 and the case (such as backlight case, or design case).

As is schematically shown in FIG. 13, since an external force is applied to the surface of the panel 15 by a user operation, the adhesive strength is required between the case 14 and the panel 15. In this case, there is a possibility that an operation force of 200 N or more is applied by a user operation based on ergonomics. For the adhesion B between the case 14 and the panel 15, it is required with a narrow width for the design. However, it is often difficult to withstand the force of 200 N with the narrow adhesion.

Therefore, the adhesive base 16 and the knob assembly 17 are made to have a detachable structure to allow an easy rework and replacement. That is, when a predetermined force of, for example, 150 N or more is applied to the knob assembly 17 before the above-mentioned adhesive portion is destroyed, the knob assembly 17 comes off from the adhesive base 16 so as to prevent a fatal failure in the CID 4. As such a connecting structure, the engaging force between the hook portion and the claw portion is suppressed rather than a strong engagement. Alternatively, the connecting force is suppressed by the plunger, or a connecting structure is defined by a magnet, so as to easily adjust the load for the falling off.

Figure 14:
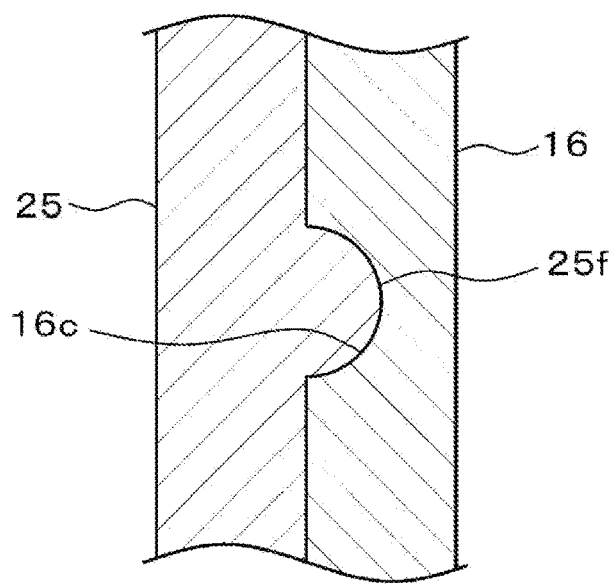
FIG. 14 is a cross-sectional view illustrating an engaging structure.
Figure 15:
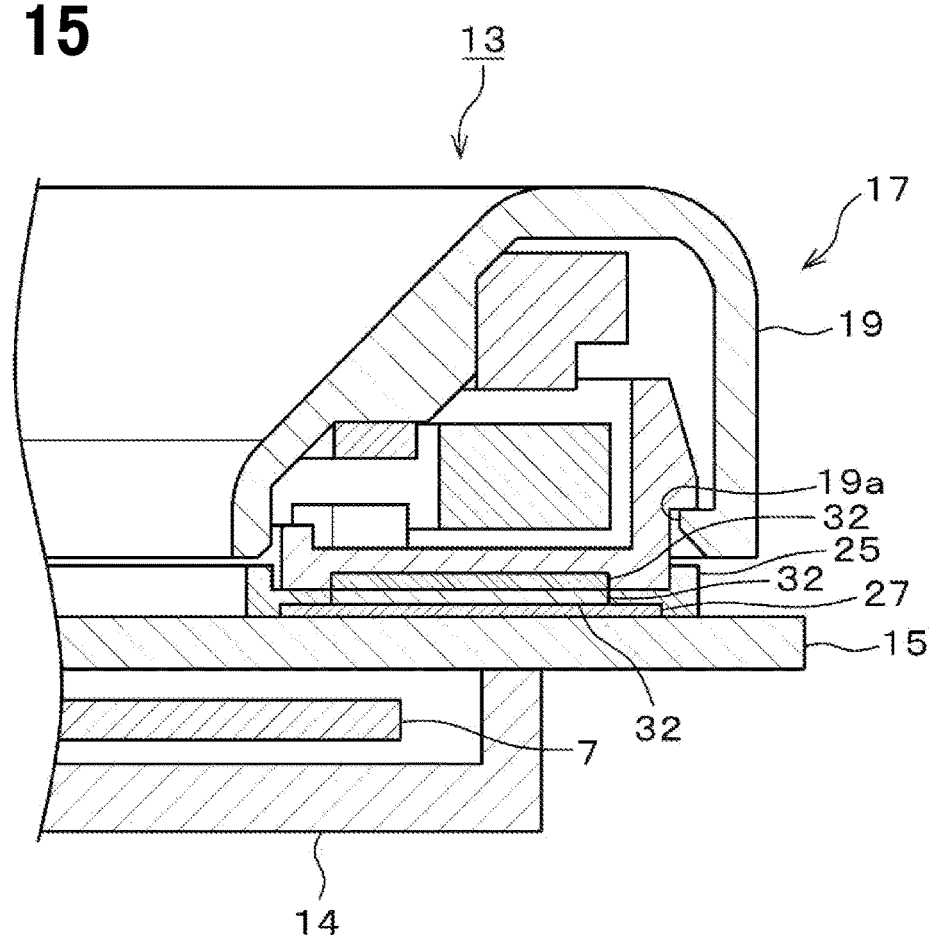
FIG. 15 is a cross-sectional view schematically showing a switch device.

FIG. 14 illustrates an example of a structure in which the engaging force between the hook portion and the claw portion is suppressed. As shown in FIG. 14, the claw portion 25f of the knob base 25 described in the fourth embodiment has a hemispherical bulging shape. Further, the hook portion 16c of the adhesive base 16 is formed into a hemispherical depressed shape, to suppress the connecting force and make it easier to come off. In addition, the connecting force is suppressed by using a plunger instead of the claw portion. Further, as shown in FIG. 15, the connecting force is suppressed by fixing magnets 32 having opposite polarities to the adhesive base 16 and the knob base 25, respectively.

When the wiring from the knob assembly 17 is taken out by the FPC 24 as in each of the above embodiments, the FPC 24 can be temporarily fixed to the adhesive base 16. Thus, it is possible to prevent a break of the FPC 24 when the knob assembly 17 is detached from the adhesive base 16.

According to the present embodiment, the connecting force between the adhesive base 16 and the knob assembly 17 is set so that the knob assembly 17 is disengaged from the adhesive base 16 before the knob assembly 17 affects the CID. Thus, if a large external force is applied to the switch device 13, it is possible to surely prevent the CID 4 from being destroyed.

Other Embodiments

The central portion of the switch device may be closed. The switch device may be provided on a display other than the CID 4. The switch device may have a configuration in which only a pressing operation can be performed. A swing operation or a sliding operation may be performed in the switch device, or they can be combined with each other.

Although the present disclosure has been described in accordance with the embodiments, it is understood that the present disclosure is not limited to such embodiments or structures. The present disclosure also includes various modifications and variations within an equivalent range. In addition, various combinations and configurations, as well as other combinations and configurations that include only one element, more, or less, are within the scope and spirit of the present disclosure.

What is claimed is:

1. A switch device comprising:
an adhesive base adhered to a surface of a surface member;
an operation knob assembly connected to the adhesive base;
a detector that detects an operation on the operation knob assembly; and
an output unit that outputs a detection result of the detector to outside, wherein the operation knob assembly includes
a knob base connected to the adhesive base, and
an operation knob that is rotatable with respect to the knob base,
the detector detects rotation of the operation knob with respect to the knob base, and
the knob base is connected to the adhesive base by being pressed in a downward direction along an axial direction of the operation knob such that the knob base locks in place and is removable by being disconnected from the adhesive base by being lifted in an upward direction opposite from the downward direction.

2. The switch device according to claim 1, wherein the detector is an optical sensor.

3. The switch device according to claim 1, wherein
the adhesive base includes an upwardly extending cylindrical wall portion, and
the knob base has a hole formed therein, wherein
the upwardly extending cylindrical wall portion of the adhesive base engages with the hole formed in the knob base in a press-fitted state.

4. A switch device comprising:
an adhesive base adhered to a surface of a surface member;
an operation knob assembly connected to the adhesive base;
a detector that detects an operation on the operation knob assembly; and
an output unit that outputs a detection result of the detector to outside, wherein
the operation knob assembly includes
a knob base connected to the adhesive base,
an operation knob that is able to rotate and press against the knob base,
a rotation ring that is able to rotate with respect to the knob base,
an urging portion that urges the rotation ring to an initial position, and
a push ring that rotates the rotation ring against an urging force of the urging portion as the operation knob moves in a pressing direction,
the detector detects rotation of the operation knob with respect to the knob base and rotation of the rotation ring with respect to the knob base, and
the knob base is connected to the adhesive base by being pressed in a downward direction along an axial direction of the operation knob such that the knob base locks in place and is removable by being disconnected from the adhesive base by being lifted in an upward direction opposite from the downward direction.

5. The switch device according to claim 4, wherein the knob base is made of a material having a same coefficient of linear expansion as that of the surface member.

6. The switch device according to claim 4, further comprising a connector that connects the adhesive base and the knob base with each other.

7. The switch device according to claim 6, wherein
the connector has
a claw portion provided on the knob base, and
a hook portion provided on the adhesive base to engage with the claw portion.

8. The switch device according to claim 6, wherein the connector disconnects the adhesive base and the knob base from each other when a predetermined load is applied on the operation knob assembly.

9. The switch device according to claim 4, wherein the detector is a tact switch.

10. The switch device according to claim 4, wherein
the adhesive base includes an upwardly extending cylindrical wall portion, and
the knob base has a hole formed therein, wherein
the upwardly extending cylindrical wall portion of the adhesive base engages with the hole formed in the knob base in a press-fitted state.

* * * * *